United States Patent [19]
Teraoka

[11] Patent Number: 5,938,420
[45] Date of Patent: Aug. 17, 1999

[54] FASTENING STRUCTURE OF ROTOR BODY AND ROTOR SHAFT AND FLUID MACHINE USING THIS FASTENING STRUCTURE

[75] Inventor: Masao Teraoka, Tochigi, Japan

[73] Assignee: Tochigi Fuji Sangyo Kabushiki Kaisha, Tochigi-Ken, Japan

[21] Appl. No.: 08/820,058

[22] Filed: Mar. 18, 1997

[30] Foreign Application Priority Data

Mar. 18, 1996 [JP] Japan .................................. 8-061188

[51] Int. Cl.⁶ .............................. F01C 1/16; F01C 21/00; F04D 29/20
[52] U.S. Cl. .................. 418/201.1; 418/270; 416/244 A; 415/216.1; 403/279
[58] Field of Search .............................. 418/201.1, 206.1, 418/270; 415/216.1; 416/204 R, 204 A, 244 R, 244 A; 403/279, 281

[56] References Cited

U.S. PATENT DOCUMENTS 4,595,349  6/1986  Preston et al. ....................... 418/206.1

FOREIGN PATENT DOCUMENTS 716090  1/1942  Germany ............................... 416/244

*Primary Examiner*—John J. Vrablik
*Attorney, Agent, or Firm*—Howard & Howard

[57] ABSTRACT

A fastening structure has a screw rotor fixing a rotor shaft to a shaft hole of a rotor body. A casing includes the rotor therein, and a positioning portion and a screw portion are arranged between the shaft hole and the rotor shaft. Press fit portions are arranged at both axial ends of the shaft hole. The screw portion receives driving torque inputted to the rotor shaft and moves the rotor body so that the shaft hole and the rotor shaft hit against each other in the positioning portion. Accordingly, a fixing function of the rotor body and the rotor shaft is strengthened as the input torque to the rotor is increased. Further, the rotor has a simple structure and is cheaply manufactured. Furthermore, it is possible to prevent reductions in performance and durability of the rotor caused by any shift in position between the rotor body and the rotor shaft.

20 Claims, 5 Drawing Sheets

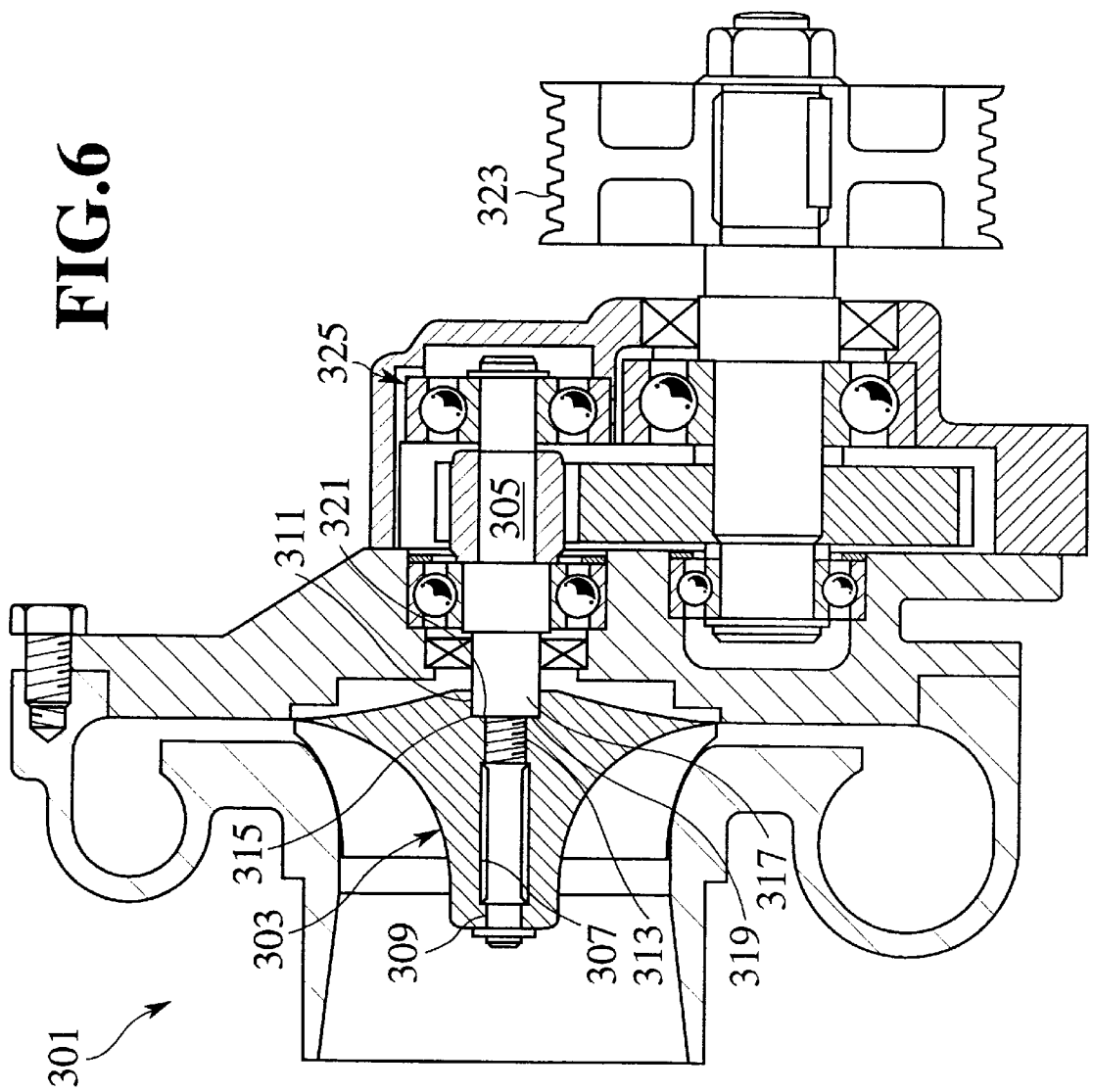

FASTENING STRUCTURE OF ROTOR BODY AND ROTOR SHAFT AND FLUID MACHINE USING THIS FASTENING STRUCTURE

BACKGROUND OF THE INVENTION

This invention relates to a fastening structure of a rotor body and a rotor shaft, and a fluid machine in which the rotor body and the rotor shaft are fixed to each other by this fastening structure.

Japanese Utility Model Application Laid-Open (JP-U) No. 58-8784 describes a screw rotor 301 as shown in FIG. 1. Japanese Patent Application Laid-Open (JP-A) No. 60-11695 also describes a rotating blower 303 as shown in FIG. 2.

The screw rotor 301 in FIG. 1 is constructed by casting a rotor portion 307 into a shaft 305. Many projections 308 formed in the shape of an angular screw are formed in the shaft 305. These projections 308 are discontinuously formed in a circumferential direction of the shaft 305. The shaft 305 and the rotor portion 307 are fixed to each other by these projections 309 such that the shaft 305 and the rotor portion 307 do not move relative to each other in either the rotating or axial directions.

In the rotating blower 303 in FIG. 2, a shaft 313 of a rotor 311 and a rotor portion 315 are fixed to each other by a spline portion 321 and press fit portions 317, 319 having different diameters and formed in two positions. Thus, the rotor shaft 313 and the rotor portion 315 do not move relative to each other in either the rotating or axial directions. The rotor shaft 313 and the rotor portion 315 are also centered by the press fit portions 317 and 319.

A large driving torque is applied to the rotor rotated at high speed at its starting time. Accordingly, in the rotor with a separately manufactured rotor body and rotor shaft fixed to each other, there is a fear that positions of the rotor body and the rotor shaft shift from each other when torque is applied to this rotor. When the positions of the rotor body and the rotor shaft are shifted from each other, contact between the rotor and a casing, and contact between rotors may occur. As a result, vibrations and noise are produced, and performance and durability of the rotor are reduced.

In the above mentioned conventional rotors 301 and 311 (see FIGS. 1 and 2), the rotor portions 307, 315 and the shafts 305, 313 are fixed to each other by the projections 308 with respect to shaft 305 and, the press fit portions 317, 319 and the spline portion 321 with respect to shaft 313. These fixing functions are constant even when input torque inputted to each of the rotors 301 and 311 is changed. Accordingly, for example, the positions of the rotor portions 307, 315 and the shafts 305, 313 are shifted from each other when the input torque exceeds the fixing ability. This may occur as when a clutch for transmitting and untransmitting the input torque is suddenly coupled. Thus, as mentioned above, vibrations and noises are caused so that performance and durability of the rotor are reduced.

The screw rotor 301 (see FIG. 1) with projections 308 has a complicated structure. Further, it is necessary to cast the shaft 305 and the rotor portion 307 to fix the shaft 305 and the rotor portion 307 to each other. Accordingly, a processing method of the shaft 305 and the rotor portion 307 is limited to casting so that the rotor is correspondingly expensive.

SUMMARY OF THE INVENTION

Therefore, an object of the present invention is to provide a fastening structure of a rotor body and a rotor shaft in which no shift in position between the rotor body and the rotor shaft is caused even at large torque loads. Another object of the present invention is to provide a rotor having a simple structure with a reduced cost, and to provide a fluid machine for preventing reductions in performance and durability of the rotor by preventing the shift in position between the rotor body and the rotor shaft using the fastening structure of the present invention.

To achieve the above object, a fastening structure of a rotor body and a rotor shaft in the present invention comprises the rotor body having a shaft hole. The rotor shaft is inserted into the shaft hole and fixed to the rotor body. A positioning portion is arranged in an axial direction between the rotor body and the rotor shaft. A screw portion is arranged between the shaft hole and the rotor shaft and receiving driving torque inputted to the rotor shaft and moving the rotor body in a direction in which the rotor body and the rotor shaft hit against each other in said positioning portion. Press fit portions are arranged between the shaft hole and the rotor shaft on both axial sides of the screw portion and center the rotor body and the rotor shaft.

Accordingly, when driving torque is applied to the screw portion, the rotor body is moved by thrust force of the screw portion so that the rotor body and the rotor shaft abutting each other in the positioning portion. Thus, the rotor body and the rotor shaft are fixed against relative axial direction. Further, relative rotation of the screw portion and shaft is stopped by this abutment in the positioning portion so that the rotor body and the rotor shaft are also positioned in a rotating direction thereof.

The shift in position between the rotor body and the rotor shaft at a receiving time of the input torque is prevented by both fixing functions (positioning functions) in the axial and rotating directions. Thus, contacts between the rotors and a casing, contact between the rotors, and generation of vibrations and noises and reductions in performance and durability of the rotor, etc. caused by these contacts are prevented.

As compared to the conventional examples, the inventive fixing functions are strengthened as the input torque is increased. Accordingly, for example, any shift in position between the rotor body and the rotor shaft is effectively prevented even when large torque is applied to the rotors for a short time, as when a clutch is suddenly coupled.

The fixing functions using the screw portion and the positioning portion are further strengthened by a fixing function of the press fit portions arranged on both the axial sides.

The rotor body and the rotor shaft are centered by the press fit portions between the shaft hole and the rotor shaft so that rotating balance of the rotors is basically improved. Accordingly, rotation of the rotors can be balanced by a structure for providing a slight balance of these rotations so that cost of the rotors is reduced. Further, vibrations and noises of the rotors are reduced and reductions in performance and durability of the rotors, etc. are prevented.

Different from the conventional example of FIG. 1, casting for fixing the rotor shaft and the rotor body to each other is not required, so that cost of the rotors can be correspondingly reduced.

Accordingly, no manufacturing method of the rotor body is limited to casting in the fastening structure of the present invention. For example, the rotor body can be processed by extruding, drawing, press working, cutting work, etc. Thus, while the rotor body is manufactured by an arbitrary processing method, a strong fixing function of the rotor body and the rotor shaft in the present invention is still obtained.

In an advantageous embodiment of the fixing function of the present invention, it is extremely effective to coat the screw portion with an adhesive.

The screw portion can be arranged on one axial side of the shaft hole.

In such a construction, thermal expansion and shrinkage of a rotor caused by a change in temperature are caused with the positioning portion as a starting point, and are absorbed by sliding movements in the press fit portions on both axial sides. However, since the screw portion is arranged on one axial side of the shaft hole, the thermal expansion and shrinkage of the rotor are approximately limited to the other axial side of the rotor.

Accordingly, it is possible to easily prevent reductions in performance and durability of the rotor caused by a change in size of the rotor by only taking countermeasures such that the change in size of the rotor is escaped on the other axial side.

The positioning portion can be arranged between the shaft hole and the rotor shaft.

In accordance with such a construction, an increase in axial length of the rotor shaft and large sizing of a device using this fastening structure are avoided by arranging the positioning portion between the shaft hole and the rotor shaft.

Further, since an arranging position of the positioning portion can be selected over an entire length of the shaft hole, the degree of design freedom of the rotor body and the rotor shaft is greatly improved.

The positioning portion can be arranged between an end face of the rotor body and the rotor shaft.

In accordance with such a construction, the end face of the rotor body is utilized in the positioning portion. Accordingly, it is not necessary to process the rotor body to arrange the positioning portion. Thus, the cost of the rotor body can be reduced and the degree design freedom of the rotor body and the rotor shaft is correspondingly increased.

Further, it is not necessary to form a step in a thick portion around the shaft hole of the rotor body so that fastening strength can be sufficiently secured.

The press fit portions can be formed in both axial end portions of the shaft hole, and the screw portion can be arranged between the press fit portions.

In accordance with such a construction, since the press fit portions are formed in both the axial end portions of the shaft hole, a span of the rotor body at its supporting point is widened so that the rotor body is correspondingly reliably supported by the rotor shaft.

Further, the screw portion is arranged between the press fit portions at both the axial ends of the shaft hole. Accordingly, the press fit portions respectively have different diameters and these different diameter portions can be utilized in the positioning portion in which the rotor body (shaft hole) and the rotor shaft hit against each other. Therefore, the positioning portion can be easily formed at low cost.

The above fastening structure can be also applied to a fluid machine having a pair of rotors and a casing. In this case, each of the rotors is constructed by a rotor body and a rotor shaft fixed to a shaft hole formed at a rotating center of the rotor body. As known in the prior art, the rotors are engaged with each other in a tooth-shaped convex portion formed in an outer circumference of the rotor body in a state in which the tooth-shaped convex portions are in or out of contact with each other. These rotors are rotatable arranged within the casing. The casing has a flow inlet and a flow outlet of a fluid. The fluid is moved in a direction intersecting a rotating axis direction of each of the rotors.

For example, such a fluid machine is constructed by a fluid machine of a Roots blower type using a rotor of a cocoon type in cross section, or a fluid machine of a gear type. The rotor body (shaft hole) and the rotor shaft of one or both of the rotors as a pair are fastened by the above fastening structure.

Accordingly, for example, if this fluid machine of a biaxial type is used in a compressor for a supercharger of a vehicle, any shift in position between the rotor body and the rotor shaft in the axial or rotating directions is prevented by the above fixing function using each fastening structure even when the supercharger is started and stopped repeatedly. This fixing function is strengthened as input torque is increased even when large torque is applied to the supercharger for a short time, as in a case in which a clutch is suddenly coupled.

Thus, contacts between the rotors and the casing and contact between the rotors are prevented since no shift in position between the rotor body and the rotor shaft is caused. Further, rotating balance of each of the rotors is improved by centering effects of the rotor body and the rotor shaft provided by the press fit portions of the fastening structure so that generation of vibrations and noises and reductions in performance and durability of the supercharger are prevented.

Further, for example, the above fastening structure is provided for strongly fastening the rotor body and the rotor shaft is applied to the rotor of a cocoon type in cross section in which the moment of inertia of the rotor body is large and a load applied to a fixing portion between the rotor body and the rotor shaft is correspondingly increased. In this case, large effects are particularly obtained with respect to prevention of the reductions in performance and durability.

The tooth-shaped convex portion of the rotor body can be formed in a screw shape.

Such a fluid machine is of a so-called screw type and the rotor body (shaft hole) and the rotor shaft of one or both of the rotors as a pair are fastened by the above fastening structure.

The screw type fluid machine is used in a high speed rotation in which detrimental influences such as vibrations caused by rotating unbalance tend to be prevalent and the device tends to be heated to a high temperature. In addition, the screw type fluid machine compresses a fluid which produces heat, such that the casing and rotors tend to be heated to a high temperature. As for the above fastening structure, a rotating balance of each of the rotors is preferable and it is easy to take countermeasures for extension and shrinkage caused by a change in temperature of the rotors. Accordingly, large effects are particularly obtained with respect to prevention of the reductions in performance and durability in a device such as the screw type fluid machine.

Further, in case of the pair of rotors comprising rotors of a male type and a female type, the rotor of a male type has thick teeth and moment of inertia of the rotor body is large so that a large load is applied to a fixing portion between the rotor body and the rotor shaft. However, the rotor body is strongly fastened to the rotor shaft by the above fastening structure so that looseness of the fixing portion is effectively prevented.

The above fastening structure can also be applied to a fluid machine having one rotor and a casing. In this case, the rotor is constructed by a rotor body and a rotor shaft fixed to a shaft hole formed at a rotating center of the rotor body, and has a convex portion in an outer circumference of the rotor body. This rotor is rotatably disposed within the casing. The casing has a flow inlet and a flow outlet of a fluid.

The invention may also be applied to a fluid machine constructed by each of the fluid machines of a centrifugal type, a vane type, a scroll type, etc. In this fluid machine, one rotor (e.g., a compressor impeller or a turbine wheel) is included within the casing, and the rotor body (shaft hole) and the rotor shaft are fastened by the above fastening structure.

In particular, since the fluid machine of a centrifugal type is rotated at an extremely high speed, influences such as vibrations caused by rotating imbalance of the rotor tend to occur and the fluid machine tends to be heated to a high temperature. Further, a large load is applied to a fixing portion between the rotor body and the rotor shaft at starting, accelerating, rotation stopping times, etc. by large moment of inertia. Accordingly, the construction for strongly fastening the rotor body and the rotor shaft by the above fastening structure is particularly effective to prevent reductions in performance and durability of the fluid machine.

BRIEF DESCRIPTION OF THE DRAWINGS

FIG. 6 is a cross-sectional view showing a fluid machine of a uniaxial type having a fastening structure of the present invention.

DESCRIPTION OF THE PREFERRED EMBODIMENTS

Figure 3:
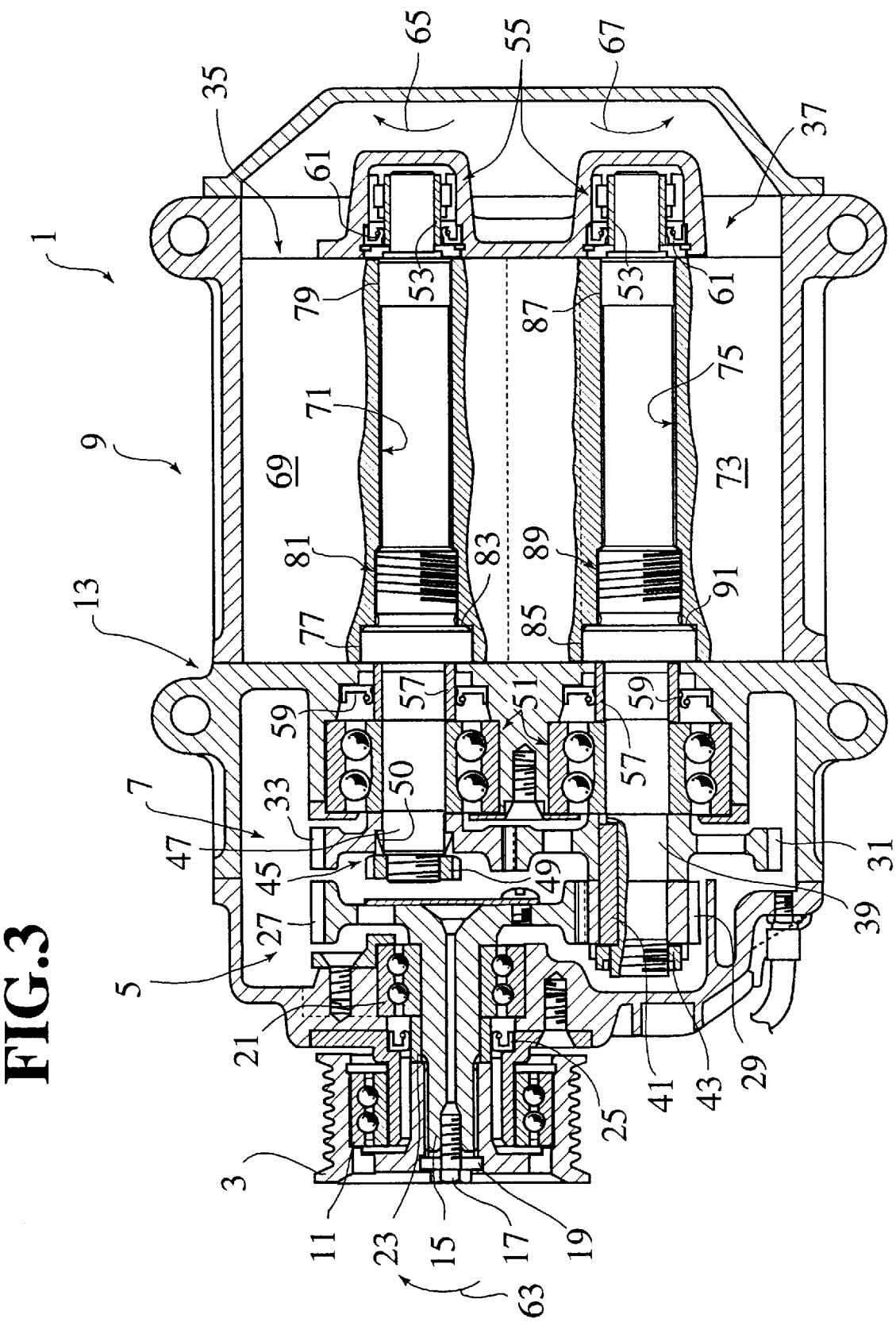
FIG. 3 is a cross-sectional view showing a first embodiment of the present invention.

A first embodiment of the present invention is described with reference to FIGS. 3 and 4. FIG. 3 shows a supercharger 1 using this embodiment. Left-hand and right-hand directions of the supercharger are set to left-hand and right-hand directions in FIG. 3 and members, etc. having no reference numbers illustrated in these figures.

As shown in FIG. 3, the supercharger 1 has an input pulley 3, a speed increasing gear set generally indicated at 5, a timing gear generally indicated at set 7, and a screw type compressor generally indicated at 9 (although other types of fluid machines may come within this invention).

The input pulley 3 is supported by a compressor casing generally indicated at 13 through a bearing 11, is spline-connected to an input shaft 15, and is fixed by a bolt 17 and a washer 19. The input pulley 3 is connected to a pulley on a crankshaft side through a belt (not shown). An electromagnetic clutch is arranged in this pulley on the crankshaft side to connect and disconnect an engine (also not shown) and the supercharger 1 from each other.

Thus, the input pulley 3 is rotated by the driving force of the engine through the electromagnetic clutch.

The input shaft 15 is supported by a ball bearing 21 within the casing 13. A seal 25 is arranged between the casing 13 and a collar 23 mounted to the input shaft 15 to prevent oil leakage.

The speed increasing gear set 5 is constructed by speed increasing gears 27 and 29 having large and small diameters and engaged with each other. The timing gear set 7 is constructed by timing gears 31 and 33 having large and small diameters and engaged with each other. The compressor 9 has screw rotors generally indicated at 35 and 37 of male and female types. For simplicity, the structure of the threads or teeth on the screw rotors are not illustrated. They are conventional.

Speed increasing gear 27 has a large diameter and is integrally formed with a right-hand end portion of the input shaft 15. The speed increasing gear 29 has a small diameter, and is connected to a rotor shaft 39 of the female type screw rotor 37 by a key 41 together with the timing gear 31 having a large diameter. Nut 43 prevents the speed increasing gear 29 from dropping. Timing gear 33 has a small diameter and is connected to a rotor shaft 47 of the male type screw rotor 35 through a taper ring fixing mechanism generally indicated at 45.

In this taper ring fixing mechanism 45, the timing gears 33 and 31 are engaged with each other in a state in which the screw rotors 35 and 37 are engaged with each other such. Thus screw rotors 35 and 37 do not come in contact with each other. Thereafter, a nut 49 is fastened and a taper ring 50 is pushed-in between the timing gear 33 and the rotor shaft 47 and the timing gear 33 is locked so that each of the screw rotors 35 and 37 is positioned in its rotating direction.

The rotor shafts 47, 39 of the screw rotors 35, 37 are respectively supported by the casing 13 through a ball bearing 51 in left-hand end portions of the rotor shafts 47, 39, and a collar 53 and a roller bearing 55 in right-hand end portions of the rotor shafts 47, 39. A seal 59 is arranged between the casing 13 and a collar 57 mounted to each of the left-hand end portions of the rotor shafts 39 and 47. A seal 61 is arranged between the casing 13 and the collar 53 in each of the right-hand end portions of the rotor shafts 39 and 47. Each of these seals 59 and 61 prevent grease leakage.

The driving force of the engine inputted from the pulley 3 is increased in speed by the speed increasing gear set 5 and rotates the screw rotors 35 and 37 through the timing gear set 7. At this time, when the pulley 3 is rotated in the direction of an arrow 63 in FIG. 3, the screw rotors 35 and 37 are respectively rotated in directions opposed to each other as shown by arrows 65 and 67. The driven compressor 9 pumps air sucked in from a suction inlet (a flow inlet) leftward in an axial direction between the screw rotors 35 and 37, and discharges this air through a discharging outlet (a flow outlet) to the engine.

The screw rotor 35 is constructed by fixedly fastening the rotor shaft 47 to a shaft hole generally indicated at 71 formed at the rotating center of a rotor body 69 as described below. The screw rotor 37 is also constructed by fixedly fastening the rotor shaft 39 to a shaft hole 75 formed at the rotating center of a rotor body 73 as described below.

As known, the rotor body 69 of the screw rotor 35 has three tooth stripes (tooth-shaped convex portions) formed in a screw shape and arranged at an equal interval in a circumferential direction of the screw rotor 35. Similarly, the rotor body 73 of the screw rotor 37 has four tooth stripes (tooth-shaped convex portions) formed in a screw shape and able to be engaged with the tooth stripes of the rotor body 69. These rotor bodies 69 and 73 are cast by aluminum.

Press fit portions 77 and 79 are respectively formed in left-hand and right-hand end portions of the screw rotor 35 between the shaft hole 71 and the rotor shaft 47 of the screw rotor 35. A screw portion 81 is formed on the left-hand side in the axial direction between the shaft hole 71 and the rotor shaft 47. Diameters of the press fit portion 77 on the left-hand side, the screw portion 81 and the press fit portion 79 on the right-hand side are reduced in this sequential order.

A positioning portion 83 is formed in the axial direction just on the right-hand side of the press fit portion 77 having a large diameter between the shaft hole 71 and the rotor shaft 47.

When the screw rotor 35 is assembled, the rotor shaft 47 is inserted into the shaft hole 71 of the rotor body 69 from the left-hand side, and the screw portion 81 is screwed with each of the press fitting portions 77 and 79 pressed-in until the rotor shaft 47 and the rotor body 69 hit against each other in the positioning portion 83.

Similarly, press fit portions 85 and 87 are respectively formed in left-hand and right-hand end portions of the screw rotor 37 between the shaft hole 75 and the rotor shaft 39 of the screw rotor 37. A screw portion 89 is formed on the left-hand side in the axial direction between the shaft hole 75 and the rotor shaft 39. Diameters of the press fit portion 85 on the left-hand side, the screw portion 89 and the press fit portion 87 on the right-hand side are reduced in this sequential order.

A positioning portion 91 is formed in the axial direction just on the right-hand side of the press fit portion 85 having a large diameter between the shaft hole 75 and the rotor shaft 39.

When the screw rotor 37 is assembled, the rotor shaft 39 is inserted into the shaft hole 75 of the rotor body 73 from the left-hand side, and the screw portion 89 is screwed with each of the press fitting portions 85 and 87 pressed-in until the rotor shaft 39 and the rotor body 73 hit against each other in the positioning portion 91.

When each of the screw rotors 35 and 37 is assembled, each of the screw portions 81 and 89 is coated with an adhesive.

As shown by the arrows 65 and 67, the screw rotors 35 and 37 are rotated in directions opposed to each other. At this time, when driving torque inputted to each of the rotor shafts 47 and 39 is applied to each of the screw portions 81 and 89, the screw portions 81 and 89 respectively move the rotor bodies 69 and 73 leftward by thrust force. Thus, stepping directions of the screw portions 81 and 89 are set to be opposed to each other.

Accordingly, when the supercharger 1 (the screw type compressor 9) is driven, the rotor bodies 69 and 73 are moved leftward by the thrust force of each of the screw portions 81 and 89 so that the shaft holes 71, 75 and the rotor shafts 47, 39 hit against each other in the positioning portions 83, 91. Accordingly, the rotor bodies 69, 73 and the rotor shafts 47, 39 are fixed against relative axial movement.

Further, relative rotation of the screw portions 81, 89 and rotor shafts 47, 39 are stopped by hitting the positioning portions 83, 91.

Shifts in position between the rotor bodies 69, 73 and the rotor shafts 47, 39 are prevented by a fixing function (a positioning function) in these axial and rotating directions when input torque is applied to each of the screw rotors 35 and 37.

As compared with the conventional examples, the thrust force of each of the screw portions 81 and 89 is strengthened and the fixing functions are strengthened as input torque is increased.

Furthermore, the fixing function of the rotor bodies 69, 73 and the rotor shafts 47, 39 is strengthened by the fixing function of each of the press fit portions 77, 79, 85 and 87 and an adhesive coating each of the screw portions 81 and 89.

The supercharger 1 is constructed as above.

In each of the above mentioned screw rotors 35 and 37 of the supercharger 1, the shifts in position between the rotor bodies 69, 73 and the rotor shafts 47, 39 are effectively prevented in both the axial and rotating directions by the fixing function of the screw portions 81, 89 and the positioning portions 83, 91 and the fixing function of the press fit portions 77, 79, 85 and 87.

Accordingly, contact between the screw rotors 35, 37 and the casing 13 and contact between the rotors 35 and 37 is prevented and noises, vibrations and reductions in performance and durability of the supercharger are prevented even when the supercharger 1 is started and stopped repeatedly.

As mentioned above, the fixing function of the screw portions 81, 89 and the positioning portions 83, 91 is strengthened as the input torque is increased. Accordingly, for example, the shifts in position between the rotor bodies 69, 73 and the rotor shafts 47, 39 are effectively prevented even when large torque is applied to the supercharger, etc. for a short time as in a case in which an electromagnetic clutch is suddenly coupled.

Figure 4:
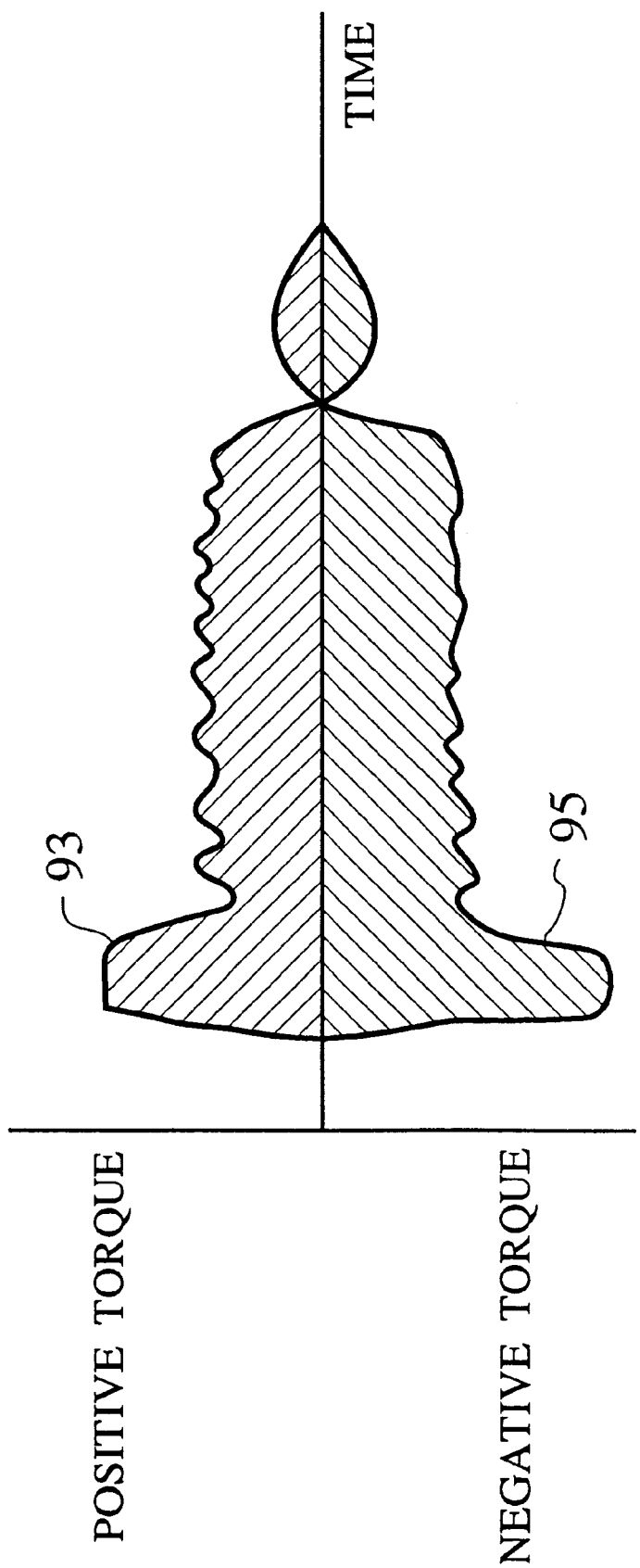
FIG. 4 is a graph showing torque in opposite directions inputted to a pair of rotors in each embodiment of the present invention.

FIG. 4 shows graphs 93 and 95 of driving torque in opposite directions respectively in putted to a pair of rotor shafts in each embodiment of the present invention. Each of the graphs 93 and 95 shows a change in driving torque when the electromagnetic clutch is suddenly coupled. As shown in each of the graphs 93 and 95, the input torque applied to the respective rotor shafts are equal in a change in strength and are opposite in direction.

In the first embodiment, the graph 93 of the rotor shaft 47 rotated in the same direction (the directions of arrows 63 and 65) as the pulley 3 is set to be positive, and the graph 95 of the rotor shaft 39 rotated in an opposite direction (the direction of an arrow 67) is set to be negative.

The rotor bodies 69 and 73 are moved by the screw portions 81 and 89 for receiving these positive and negative input torque, but their moving directions are the same direction (leftward direction) as mentioned above. Accordingly, no clearance between the screw rotors 35 and 37 is changed even when torque is inputted to these screw rotors. Therefore, performance and durability of the screw rotors are not reduced.

The rotor bodies 69, 73 and the rotor shafts 47, 39 are centered by the respective press fit portions 77, 79, 85 and 87. Therefore, rotating balances of the respective screw rotors 35 and 37 are basically improved so that it is sufficient to slightly balance the rotations of the screw rotors 35 and 37, and vibrations and noises of the supercharger 1 are reduced.

Thermal expansion and shrink age caused by a change in temperature of each of the screw rotors 35 and 37 are caused with the positioning portions 83 and 91 as starting points, and are absorbed by sliding movements in the press fit portions 77, 85, 79 and 87 on both axial sides of the screw rotors. However, as mentioned above, since the screw portions 81 and 89 are arranged on the left-hand side in the axial direction, a change in size of each of the screw rotors caused by the thermal expansion and shrinkage is approximately limited to the right-hand side in the axial direction.

Therefore, the reductions in performance and durability of the supercharger 1 caused by the thermal expansion and shrinkage can be easily prevented by taking only countermeasures such that the roller bearing 55 is arranged on the right-hand side and the change in size of each of the screw rotors 35 and 37 is escaped on the right-hand side.

The positioning portions 83, 91 are formed between the shaft holes 71, 75 and the rotor shafts 47, 39 so that increases in axial length of the rotor shafts 47 and 39 and large sizing of the supercharger 1 are avoided.

Since the positioning portions 83, 91 are formed between the shaft holes 71, 75 and the rotor shafts 47, 39, arranging positions of the positioning portions can be selected over entire lengths of the shaft holes 71 and 75 so that a degree of freedom on design of the rotor bodies 69, 73 and the rotor shafts 47, 39 is greatly improved.

The left-hand press fit portions 77, 85 and the right-hand press fit portions 79, 87 are arranged at both the axial ends of the rotor bodies 69, 73 so that supporting point spans of the rotor bodies 69, 73 are widened. Accordingly, the rotor bodies 69 and 73 are correspondingly strongly supported by the rotor shafts 47 and 39.

Further, the press fit portions 77, 85 and the press fit portions 79, 87 have different diameters since the screw portions 81, 89 are arranged between the left-hand press fit portions 77, 85 and the right-hand press fit portions 79, 87. Accordingly, the positioning portions 83 and 91 can be easily formed by utilizing portions of the different diameters caused by the press fit portions 77 and 85 having large diameters.

Figure 1:
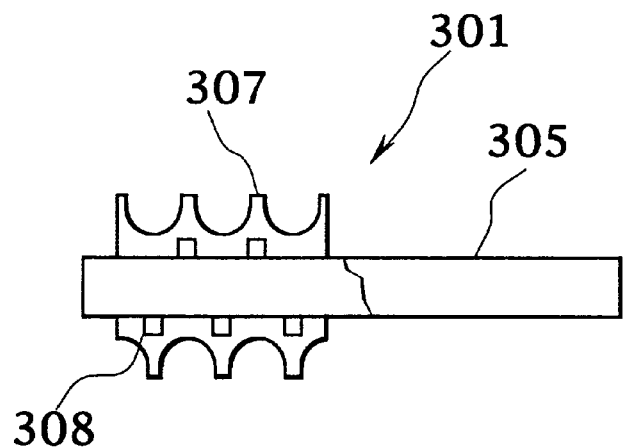
FIG. 1 is a cross-sectional view of a screw rotor as a conventional example.
Figure 2:
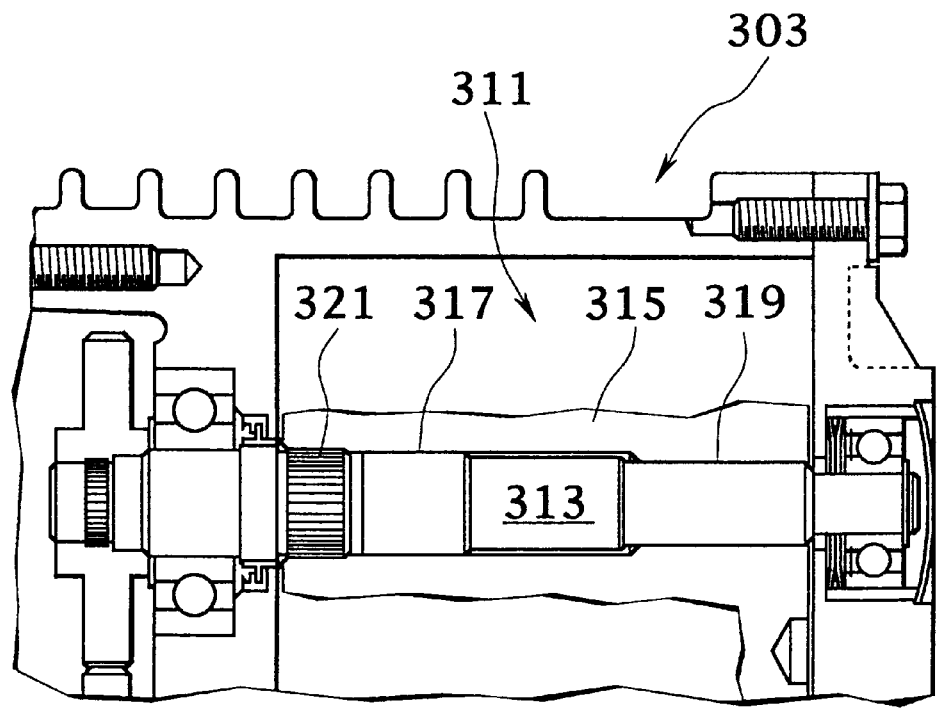
FIG. 2 is a cross-sectional view of a rotating blower as another conventional example.

Different from the conventional example of FIG. 1, no casting for fixing the rotor shafts and the rotor bodies to each other is required with respect to each of the screw rotors 35 and 37 so that cost of each of the screw rotors is correspondingly reduced. Further, a strong fixing function of the rotor bodies 69, 73 and the rotor shafts 47, 39 is obtained as mentioned above while the rotor bodies 69 and 73 are processed in an arbitrary method including casting.

Since the male type screw rotor 35 has thick teeth, the moment of inertia of the rotor body 69 is large and a large load is applied to a fixing portion between the rotor body 69 and the rotor shaft 47. However, as mentioned above, looseness of the fixing portion, etc. are effectively prevented since the rotor body 69 is strongly fastened to the rotor shaft 47.

Since the screw type compressor 9 is used in a high speed rotation, influences on the compressor 9 such as vibrations, etc. caused by rotating unbalance tend to be occur frequently so that the compressor tends to be heated to a high temperature. However, as mentioned above, in the construction of the present invention, rotations of the screw rotors 35 and 37 are preferably balanced, and countermeasures for expansion and shrinkage caused by a change in temperature are easily taken. Accordingly, the construction of the present invention is particularly advantageous with respect to such a screw type compressor 9, and large effects are obtained in preventing vibration, prevention of reductions in performance and durability, etc. as mentioned above.

Figure 5:
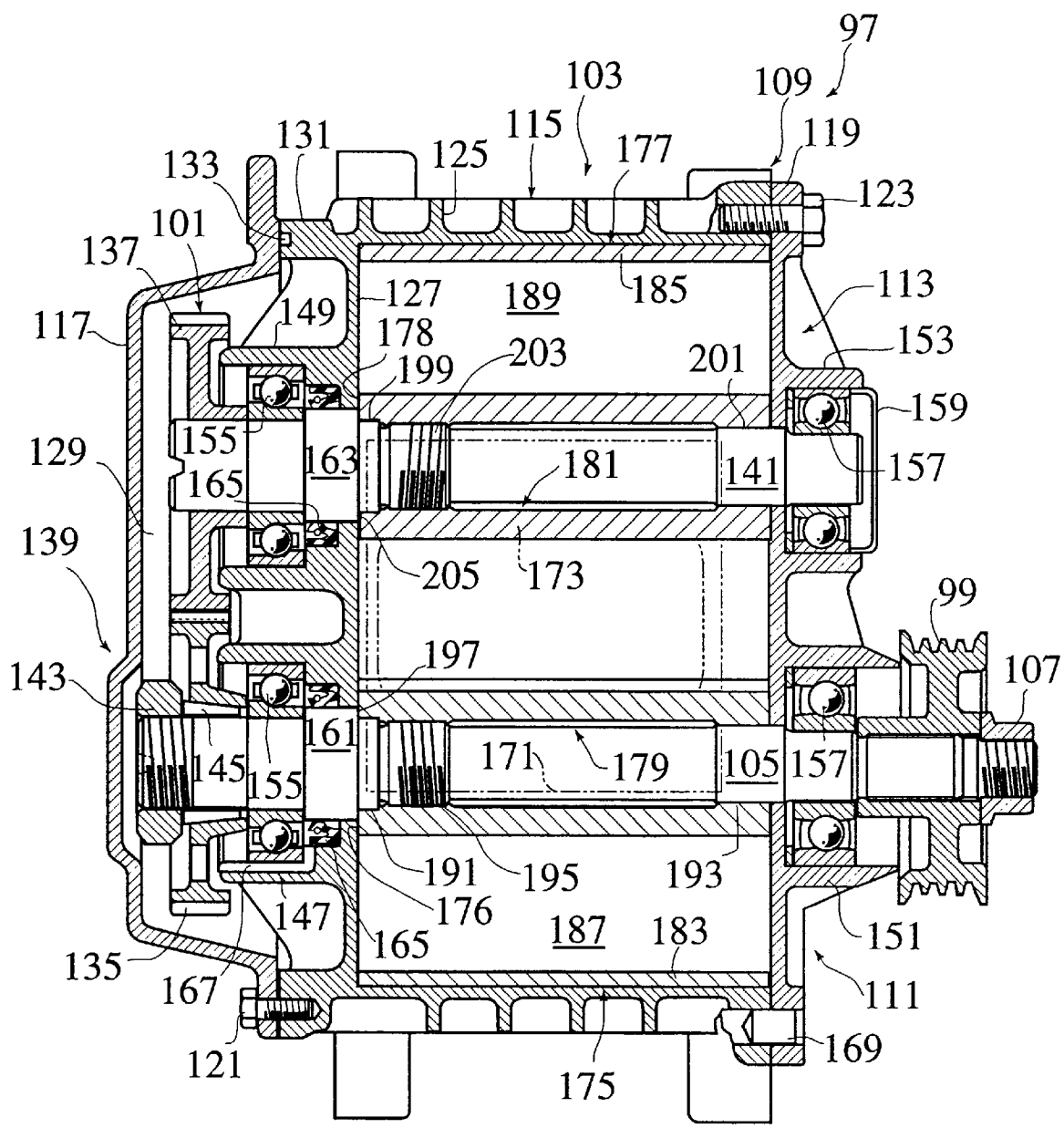
FIG. 5 is a cross-sectional view showing a second embodiment of the present invention.

A second embodiment of the present invention will next be described with reference to FIG. 5. FIG. 5 shows a supercharger 97 of this embodiment. Left-hand and right-hand directions of the supercharger 97 are set to left-hand and right-hand directions in FIG. 5, and members having no reference numerals, etc. are not illustrated in FIG. 5.

As shown in FIG. 5, the supercharger 97 is constructed by an input pulley 99, a timing gear set generally indicated at 101, a Roots type compressor generally indicated at 103 (as with the above embodiment, types of fluid machines can benefit from the features of this embodiment).

The input pulley 99 is spline-connected to a rotor shaft 105 on an input side and is fixed by a nut 107. The input pulley 99 is connected to a pulley on a crankshaft side through a belt. An electromagnetic clutch is assembled into this pulley on the crankshaft side. The electromagnetic clutch is used to connect and disconnect an engine and the supercharger 97.

Thus, the input pulley 99 is rotated by driving force of the engine through the electromagnetic clutch.

The compressor 103 has a compressor casing generally indicated at 109 and rotors generally indicated at 111, 113 of a cocoon type in cross section arranged within the compressor casing 109.

The compressor casing 109 is constructed by a casing body generally indicated at 115, left-hand and right-hand covers 117, 119. The the cover 117 is fixed onto a left-hand side of the casing body 115 by a bolt 121. The rover 119 is fixed onto a right-hand side of the casing body 115 by a bolt 123. A cooling fin 125 for cooling the compressor 103 is formed in the casing body 115. The left-hand cover 117 is made by sheeting of a thin steel plate.

A gear chamber 129 is formed between the cover 117 and a wall portion 127 of the casing body 115. An oil reservoir is formed in this gear chamber 129. An oil seal 133 is arranged between the cover 117 and an overhang portion 131 arranged on a side of the gear chamber 129 of the casing body 115 is as to prevent oil leakage.

The timing gear set 101 is constructed by a pair of timing gears 135 and 137 engaged with each other. The timing gear 135 is connected to the above rotor shaft 105 of the rotor 111 through a taper ring fixing mechanism 139. The timing gear 137 is press-fitted into a rotor shaft 141 of the rotor 113.

This taper ring mechanism 139 engages the timing gears 135 and 137 with each other in a state in which the rotors 111 and 113 are engaged with each other such that these rotors 103 and 113 do not come in contact with each other. Thereafter, a nut 143 is fastened so that a taper ring 145 is pushed-in between the timing gear 135 and the rotor shaft 105 and the timing gear 135 is locked. Thus, the taper ring fixing mechanism 139 positions each of the rotors 111 and 113 in its rotating direction.

The timing gear 135 scrapes oil upward from the oil reservoir of the gear chamber 129 to lubricate an engaging portion between the timing gears 135 and 137, and ball bearings 155.

Boss portions 147 and 149 are formed in the wall portion 127 of the casing body 115 and are protected onto a side of the gear chamber 129. Boss portions 151 and 153 are formed in the right-hand cover 119. Left-hand end portions of the rotor shafts 105 and 141 are respectively supported by the boss portions 147 and 149 through the ball bearings 155.

Right-hand end portions of the rotor shafts 105 and 141 are respectively supported by the boss portions 151 and 153 through ball bearings 157 of a seal type. The respective ball bearings 157 are slightly press-fitted into the boss portions 151 and 153. A bearing cap 159 is attached to an opening of the boss portion 153 to prevent dust, etc. from entering this boss portion 153.

Large diameter portions 161 and 163 are respectively formed in the rotor shafts 105 and 141 on a right-hand side of the ball bearings 155. A seal 165 is arranged between the casing body 115 and each of the large diameter portions 161 and 163 to prevent air leakage and oil leakage. An oil flow path 167 is formed in the boss portions 147 and 149, and the oil from the oil reservoir is guided to this seal 165 to perform a lubricating operation.

Air leakage is prevented by the seal type ball bearings 157 on the right-hand side of the rotor shafts 105 and 141.

The casing body 115 and the cover 119 are positioned by a positioning pin 169 to conform central positions of the rotor shafts 105 and 141 to central positions of the bosses 151 and 153, respectively.

Each of the rotors 111 and 113 is rotated by driving force of an engine inputted from the pulley 99 through the timing gear set 101. The rotors 111 and 113 are rotated in directions opposed to each other. The driven compressor 103 pumps air sucked from a suction inlet 171 (a flow inlet) in a direction approximately perpendicular to a rotating axis direction of each of the rotors 111 and 113. This air is discharged from a discharging outlet 173 (a flow outlet) and is supplied to the engine.

The rotor 111 is constructed by a rotor body generally indicated at 175 and the rotor shaft 105. The rotor 113 is constructed by a rotor body generally indicated at 177 and the rotor shaft 141. The rotor shafts 105 and 141 are respectively fixedly fastened to shaft holes generally indicated at 179 and 181 formed at rotating centers of the rotor bodies 175 and 177 as mentioned below.

As mentioned above, the rotors 111 and 113 are of a cocoon type in cross section. Two tooth-shaped convex portions 183 and 185 are respectively formed in an axial direction in outer circumferences of the rotor bodies 175 and 177. The rotors 111 and 113 are respectively engaged with these tooth-shaped convex portions 183 and 185.

Hollow portions 187 and 189 are respectively formed in these tooth-shaped convex portions 183 and 185 so that moment of inertia of each of the rotors 111 and 113 is reduced. Accordingly, response of the supercharger 97 is greatly improved at an accelerating time thereof, etc. Each of the rotor bodies 175 and 177 is cast by aluminum.

Press fit portions 191 and 193 are respectively formed in left-hand and right-hand end portions of the rotor 111 between the rotor shaft 105 and the shaft hole 179 of the rotor body 175. The rotor shaft 105 and the shaft hole 179 are centered by the press fit portions 191 and 193. A screw portion 195 is formed on the left-hand side in the axial direction between these press fit portions 191 and 193. Diameters of the press fit portion 191 on the left-hand side, the screw portion 195 and the press fit portion 193 on the right-hand side are reduced in this sequential order.

A positioning portion 197 is formed in the axial direction just on the left-hand side of the press fit portion 191 having a large diameter between a large diameter portion 161 of the rotor shaft 105 and an end face 176 of the rotor body 175. In the positioning portion 197, as a side surface of the large diameter portion 161 is in contact with an end face 176 of the rotor body 175, the rotor body 175 and the rotor shaft 105 are positioned in the axial direction.

When the rotor 111 is assembled, the rotor shaft 105 is inserted into the shaft hole 179 of the rotor body 175 from the left-hand side, and the screw portion 89 is screwed with each of the press fitting portions 191 and 193 pressed-in until the rotor shaft 105 and the end face of the rotor body 175 hit against each other in the positioning portion 197.

Similarly, press fit portions 199 and 201 are respectively formed in left-hand and right-hand end portions of the rotor 113 between the rotor shaft 141 and the shaft hole 181 of the rotor body 177. The rotor shaft 141 and the shaft hole 181 are centered by the press fit portions 199 and 201. A screw portion 203 is formed on the left-hand side in the axial direction between these press fit portions 199 and 201. Diameters of the press fit portion 199 on the left-hand side, the screw portion 203 and the press fit portion 201 on the right-hand side are reduced in this sequential order.

A positioning portion 205 is formed in the axial direction just on the left-hand side of the press fit portion 199 having a large diameter between a large diameter portion 163 of the rotor shaft 141 and an end face 178 of the rotor body 177. In the positioning portion 205, as a side surface of the large diameter portion 163 is in contact with an end face 178 of the rotor body 177, the rotor body 177 and the rotor shaft 141 are positioned in the axial direction.

When the rotor 113 is assembled, the rotor shaft 141 is pressed into the shaft hole 181 of the rotor body 177 from the left-hand side. Each of the press fit portions 199 and 201 are pressed-in until the rotor shaft 141 and the end face of the rotor body 177 hit against each other in the positioning portion 205. The screw portion 203 is then screwed.

As shown in FIG. 5, stepping directions of the screw portions 195 and 203 are set to be oppose d to each other. When the rotors 111 and 113 are assembled, each of the screw portions 195 and 203 is coated with an adhesive.

The rotors 111 and 113 are rotated in directions opposed to each other. However, at this time, when driving torque inputted to each of the rotor shafts 105 and 141 is applied to each of the screw portions 195 and 203 having the opposite stepping directions, the screw portions 195 and 203 respectively move the rotor bodies 175 and 177 leftward by thrust force.

Thus, when the supercharger 97 (the Roots type compressor 103) is driven, both the rotor bodies 175 and 177 are moved leftward by the thrust force of each of the screw portions 195 and 203, and respectively hit against the rotor shafts 105 and 141 in the positioning portions 197 and 205. Accordingly, the rotor bodies 175, 177 and the rotor shafts 105, 141 are fixed against relative axial movement.

Relative rotation of the screw portions 195 and 203 are prevented by the hitting in each of the positioning portions 197 and 205, the rotor bodies 175, 177 and the rotor shafts 105, 141 are also fixed against relative rotations.

Shifts in position between the rotor bodies 175, 177 and the rotor shafts 105, 141 are prevented by this fixing function (a positioning function) in the axial and rotating directions when input torque is applied to each of the rotors 111 and 113.

Contrary to the conventional example, the thrust force of each of the screw portions 195 and 203 is increased and the fixing function thereof is strengthened as the input torque is increased.

In addition to this, the fixing function of the rotor bodies 175, 177 and the rotor shafts 105, 141 is strengthened by the fixing function of each of the press fit portions 191, 193, 199, 201 and the adhesive coating each of the screw portions 195 and 203.

The supercharger 97 is constructed as above.

As mentioned above, in the respective rotors 111 and 113 of the supercharger 97, the shifts in position between the rotor bodies 175, 177 and the rotor shafts 105, 141 are effectively prevented in both the axial and rotating directions by the fixing function of the screw portions 195, 203 and the positioning portions 197, 205 and the fixing function of the press fit portions 191, 193, 199, 201.

Accordingly, contact between the rotors 111, 113 and the compressor casing 109 and contact between the rotors 111 and 113 are prevented even when the supercharger 97 is started and stopped repeatedly. Therefore, noises, vibrations and reductions in performance and durability of the supercharger are prevented.

As mentioned above, the fixing function of the screw portions 195, 203 and the positioning portions 197, 205 is strengthened as the input torque is increased. Accordingly, for example, the shifts in position between the rotor bodies 175, 177 and the rotor shafts 105, 141 are effectively prevented even when large torque is applied to the supercharger for a short time as in a case in which an electromagnetic clutch for connecting and disconnecting the engine and the supercharger 97 is suddenly coupled.

As shown by each of the graphs 93 and 95 in FIG. 4, each of the rotor bodies 175 and 177 is moved by the thrust force of each of the screw portions 195 and 203 receiving positive and negative input torque. However, as mentioned above, since moving directions of the rotor bodies 175 and 177 are the same direction (leftward), no clearances between the rotors 111, 113 and the compressor casing 109 are changed even when torque is inputted. Accordingly, performance and durability of the supercharger are not reduced.

Further, the rotor bodies 175, 177 and the rotor shafts 105, 141 are centered by the respective press fit portions 191, 193, 199, 201. Accordingly, rotating balances of the respective rotors 111, 113 are basically improved so that it is sufficient to slightly balance rotations of the rotors 111, 113 and vibrations and noises of the supercharger 97 are reduced.

Thermal expansion and shrinkage caused by a change in temperature of each of the rotors 111, 113 are caused with the positioning portions 197, 205 as starting points, and are absorbed by sliding movements in the press fit portions 191, 193, 199, 201 on both axial sides of the rotors. However, as mentioned above, the screw portions 195 and 203 are arranged on the left-hand side in the axial direction so that a change in size of each of the rotors caused by the thermal expansion and shrinkage is approximately limited to the right-hand side in the axial direction.

Therefore, the reductions in performance and durability of the supercharger 97 caused by the thermal expansion and shrinkage can be easily prevented by simply taking countermeasures in which the ball bearings 157 on the right-hand side are slightly press-fitted into the boss portions 151, 153 to escape the change in size of each of the rotors 111, 113 on the right-hand side.

Further, since the positioning portions 197, 205 are formed by utilizing end faces of the rotor bodies 175, 177, it is not necessary to process the rotor bodies 175, 177 so as to form the positioning portions so that the rotors can be correspondingly formed at low cost.

Since it is not necessary to process the rotor bodies 175, 177 so as to form the positioning portions, the degree of design freedom on the rotor bodies 175, 177 and the rotor shafts 105, 141 is correspondingly increased.

Further, supporting point spans of the rotor bodies 175, 177 are widened by arranging the left-hand press fit portions 191, 199 and the right-hand press fit portions 193, 201 at both axial ends of the rotor bodies 175, 177 so that the rotor bodies 175, 177 are correspondingly strongly supported by the rotor shafts 105, 141.

Contrary to the conventional example of FIG. 1, no casting for fixing the rotor shafts and the rotor bodies is required with respect to each of the rotors 111 and 113. Thus, the cost of each of the rotors 111 and 113 is correspondingly reduced. Further, while the rotor bodies 175, 177 are processed in an arbitrary method including casting, a strong fixing function between the rotor bodies 175, 177 and the rotor shafts 105, 141 is still obtained as mentioned above.

In the rotors 111, 113 of a cocoon type in cross section having thick teeth, the moment of inertia of each of the rotor bodies 175, 177 is large so that a load applied to each of the fixing portions between the rotor bodies 175, 177 and the rotor shafts 105, 141 is correspondingly large. However, the construction for fixing the rotor bodies 175, 177 and the rotor shafts 105, 141 to each other by the above strong fixing function is particularly advantageous in such a supercharger 97. Accordingly, as mentioned above, large effects are obtained in vibrating prevention, prevention of reductions in performance and durability, etc.

As explained in each of the embodiments, no casting for fixing the rotor shafts and the rotor bodies to each other is required in the fastening structure of the present invention so that the manufacturing method of the rotor bodies is not limited to casting. Accordingly, for example, the rotor bodies can be processed by extruding, drawing, press working, cutting work, etc. While the rotor bodies are manufactured by an arbitrary processing method, the strong fixing function of the rotor bodies and the rotor shafts in the present invention is still obtained.

The fluid machine of the present invention is not limited to a structure (a fluid machine of a biaxial type) using a pair of rotors as in each of the embodiments.

For example, as shown in FIG. 6, in a fluid machine generally shown at 301 of a uniaxial type including one impeller (screw rotor) within at casing as in a compressor of a centrifugal type, the rotor body generally indicated at 303 and the rotor shaft 305 fasten with the above fastening structure.

Namely, in a fluid machine 301 of a uniaxial type, the driving force inputted from the pulley 323 is increased in speed by the speed increasing gear set generally indicated at 325 and rotates the rotor shaft 305 and the rotor body 303. Press fit portions 309 and 311 are respectively formed in left-hand and right-hand end portions of the screw rotor 303 between the shaft hole 307 of the rotor body 303 and the rotor shaft 313. The rotor shaft 305 and the shaft hole 307 are centered by the press fit portions 309 and 311. A screw portion 313 is formed on the right-hand side in the axial direction between the press fit portions 309 and 311. Diameters of the press fit portion 311 on the right-hand side, the screw portion 313 and the press fit portion 309 on the left-hand side are reduced in this sequential order.

A positioning portion 315 is formed in the axial direction just on the left-hand side of the press fit portion 311 having a large diameter between the shaft hole 307 and the rotor shaft 305. In the positioning portion 315, as a side surface 319 of a large diameter portion 317 of the rotor shaft 305 is in contact with an inner face 321 of the rotor body 303, the rotor body 303 and the rotor shaft 305 are positioned in the axial direction.

Thus, the above structure obtains effects equal to those in each of the embodiments by fastening a rotor body (shaft hole) and a rotor shaft by the fastening structure of the present invention.

Further, since the fluid machine of a uniaxial type is rotated at an extremely high speed, influences such as vibrations, etc. caused by rotating imbalance of the rotor tend to occur frequently so that the fluid machine tends to be heated to a high temperature. Furthermore, a large load is applied to a fixing portion between the rotor body and the rotor shaft by a large moment of inertia at starting, accelerating, etc. Accordingly, the construction for strongly fastening the rotor body and the rotor shaft by the fastening structure of the present invention is also extremely effective in the fluid machine of a uniaxial type. Therefore, similar to each of the embodiments, large improvements are obtained in preventing vibration, preventing reductions in performance and durability of the fluid machine.

The fluid machine of the present invention may be also used as a motor for taking-out rotation by providing a fluid pressure in addition to a structure for converting rotation to a fluid pressure such as a compressor and a blower.

What is claimed is:

1. A fastening structure of a rotor body and a rotor shaft comprising:

a rotor body having a shaft hole;

a rotor shaft inserted in said shaft hole;

a positioning portion arranged between said rotor body and said rotor shaft and preventing said rotor body from moving in a first direction parallel to a rotor shaft axis as said rotor body is in contact with said rotor shaft at said positioning portion;

a screw portion arranged between said shaft hole and said rotor shaft, receiving driving torque inputted to said rotor shaft, and pressing said rotor body in said first direction as said screw portion receives said driving torque; and press fitting portions arranged between said shaft hole and said rotor shaft on both axial sides of said screw portion, being independent of said positioning portion, and centering said rotor body and said rotor shaft.

2. The fastening structure as claimed in claim 1, wherein said screw portion is arranged on one axial side of said shaft hole.

3. The fastening structure as claimed in claim 1, wherein said positioning portion is arranged between said shaft hole and said rotor shaft.

4. The fastening structure as claimed in claim 1, wherein said positioning portion is arranged between an end face of said rotor body and said rotor shaft.

5. The fastening structure as claimed in claim 1, wherein said press fit portions are arranged in both axial end portions of said shaft hole and said screw portion is arranged between both of said press fit portions.

6. The fastening structure as claimed in claim 1, wherein said positioning portion includes a contact face substantially perpendicular to said first direction, and said contact face is arranged on at least one of said rotor body and said rotor shaft.

7. The fastening structure as claimed in claim 1, wherein said rotor shaft extends through said shaft hole, said press fitting portions are arranged on end portions of said shaft hole, and said positioning portion and said screw portion are adjacent to one of said press fitting portions.

8. A fluid machine comprising:

at least one rotor having a rotor body with a shaft hole at a rotating center and a convex portion in an outer circumference of said rotor;

a rotor shaft inserted in said shaft hole;

a positioning portion arranged between said rotor body and said rotor shaft and preventing said rotor body from moving in a first direction parallel to a rotor shaft axis as said rotor body is in contact with said rotor shaft at said positioning portion;

a screw portion arranged between said shaft hole and said rotor shaft, for receiving driving torque inputted to said rotor shaft, and for pressing said rotor body in said first direction as said screw portion receives said driving torque;

press fit portions arranged between said shaft hole and said rotor shaft on both axial sides of said screw portion, being independent of said positioning portion, and centering said shaft hole and said rotor shaft; and a casing rotatably including said rotor therein and having a flow inlet and a flow outlet of a fluid.

9. The fluid machine as claimed in claim 8, wherein said screw portion is arranged on one axial side of said shaft hole.

10. The fluid machine as claimed in claim 8, wherein said positioning portion is arranged between said shaft hole and said rotor shaft.

11. The fluid machine as claimed in claim 8, wherein said positioning portion is arranged between an end face of said rotor body and said rotor shaft.

12. The fluid machine as claimed in claim 8, wherein said press fit portions are arranged in both axial end portions of said shaft hole, and said screw portion is arranged between both said press fit portions.

13. The fluid machine as claimed in claim 8, wherein said positioning portion includes a contact face substantially perpendicular to said first direction, and said contact face is arranged on at least one of said rotor body and said rotor shaft.

14. A fluid machine comprising:

a pair of rotors each having a rotor body having a shaft hole at a rotating center and a tooth-shaped convex portion in an outer circumference of each of said rotors, a rotor shaft inserted in said shaft hole, and a positioning portion arranged between said rotor body and said rotor shaft and preventing said rotor body from moving in a first direction parallel to a rotor shaft axis as said rotor body is in contact with said rotor shaft at said positioning portion;

a casting rotatably including these rotors therein and having a flow inlet and a flow outlet for a fluid moved in a direction intersecting a rotating axis direction of each of said rotors;

a screw portion arranged between said shaft hole and said rotor shaft of at least one rotor of said pair of rotors, receiving driving torque inputted to said rotor shaft, and pressing said rotor body in said first direction as said screw portion receives said driving torque; and press fitting portions arranged on both axial sides of said screw portion between said shaft hole and said rotor shaft, being independent of said positioning portion, and centering said shaft hole and said rotor shaft.

15. The fluid machine as claimed in claim 14, wherein said tooth-shaped convex portion of said rotor body has a screw shape.

16. The fluid machine as claimed in claim 14, wherein said screw portion is arranged on one axial side of said shaft hole.

17. The fluid machine as claimed in claim 14, wherein said positioning portion is arranged between said shaft hole and said rotor shaft.

18. The fluid machine as claimed in claim 6, wherein said positioning portion includes a contact face substantially perpendicular to said first direction, and said contact face is arranged on at least one of said rotor body and said rotor shaft.

19. The fluid machine as claimed in claim 14, wherein said press fit portions are arranged in both axial end portions of the shaft hole, and said screw portion is arranged between both of said press fit portions.

20. The fluid machine as claimed in claim 14, wherein said positioning portion includes a contact face substantially perpendicular to said first direction, and said contact face is arranged on at least one of said rotor body and said rotor shaft.

* * * * *